United States Patent [19]
Monte Calvo

[11] Patent Number: 5,312,146
[45] Date of Patent: May 17, 1994

[54] CROCK POT SECURITY BAND

[76] Inventor: Joseph M. Monte Calvo, 1337 Niblock N.W., Warren, Ohio 44485

[21] Appl. No.: 24,090

[22] Filed: Mar. 1, 1993

[51] Int. Cl.⁵ .............................................. A47J 45/00
[52] U.S. Cl. ................................... 294/27.1; 294/165
[58] Field of Search .................... 294/27.1, 31.2, 32, 294/137, 145, 165; 70/1, 14, 158, 169; 220/315, 318, 324

[56] References Cited

U.S. PATENT DOCUMENTS

| | | | |
|---|---|---|---|
| 438,735 | 10/1890 | Miller et al. | 294/165 X |
| 1,119,235 | 12/1914 | Brandle | 220/318 X |
| 1,131,731 | 3/1915 | Pellow | 220/757 X |
| 1,329,913 | 2/1920 | McGuire | 70/158 X |
| 1,779,060 | 10/1930 | Choate | 294/27.1 X |
| 3,806,011 | 4/1974 | Meek et al. | 294/165 |
| 3,990,655 | 11/1976 | Covell | 294/165 X |
| 4,085,877 | 4/1978 | Hildebrand | 294/32 X |
| 5,076,460 | 12/1991 | Hussell | 220/324 X |

FOREIGN PATENT DOCUMENTS 6342 12/1878 Fed. Rep. of Germany ...... 294/165

*Primary Examiner*—Dean J. Kramer
*Attorney, Agent, or Firm*—Leon Gilden

[57] ABSTRACT

A base plate includes first and second guard plates mounted to opposed ends of the base plate in an orthogonal relationship, with a lock plate hingedly mounted to one of the guard plates and arranged for selective locking to a second of the guard plates to provide for a surrounding band structure relative to a crock pot positioned therewithin. The lock plate includes a stepped bottom wall to position the crock pot lid therewithin, with the crock pot lid having a crock pot lid knob arranged for projection through an associated bottom wall opening.

3 Claims, 4 Drawing Sheets

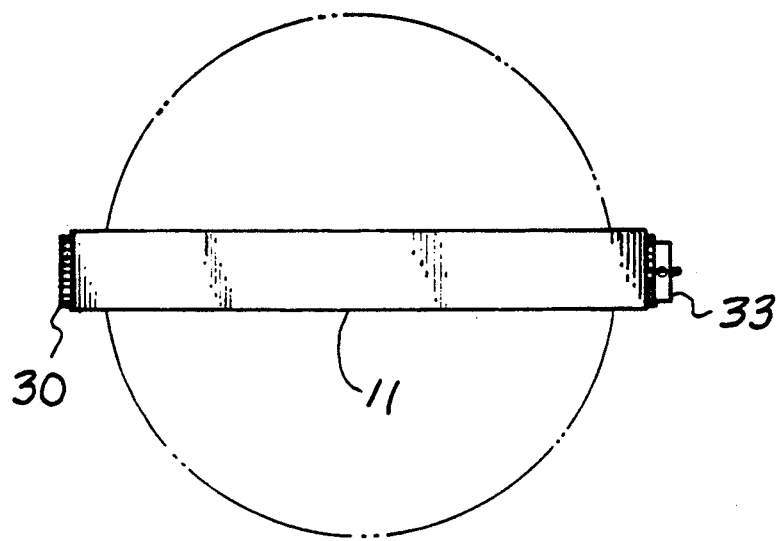
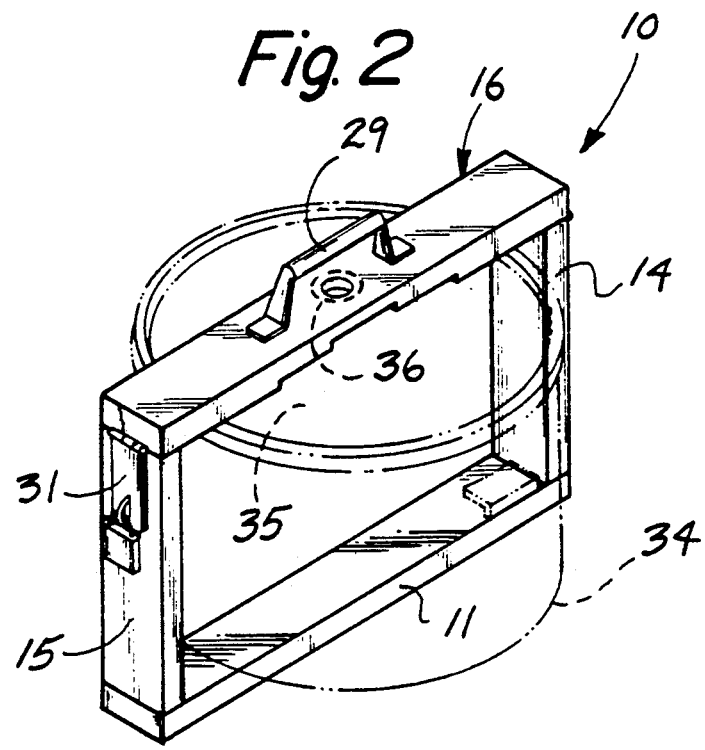

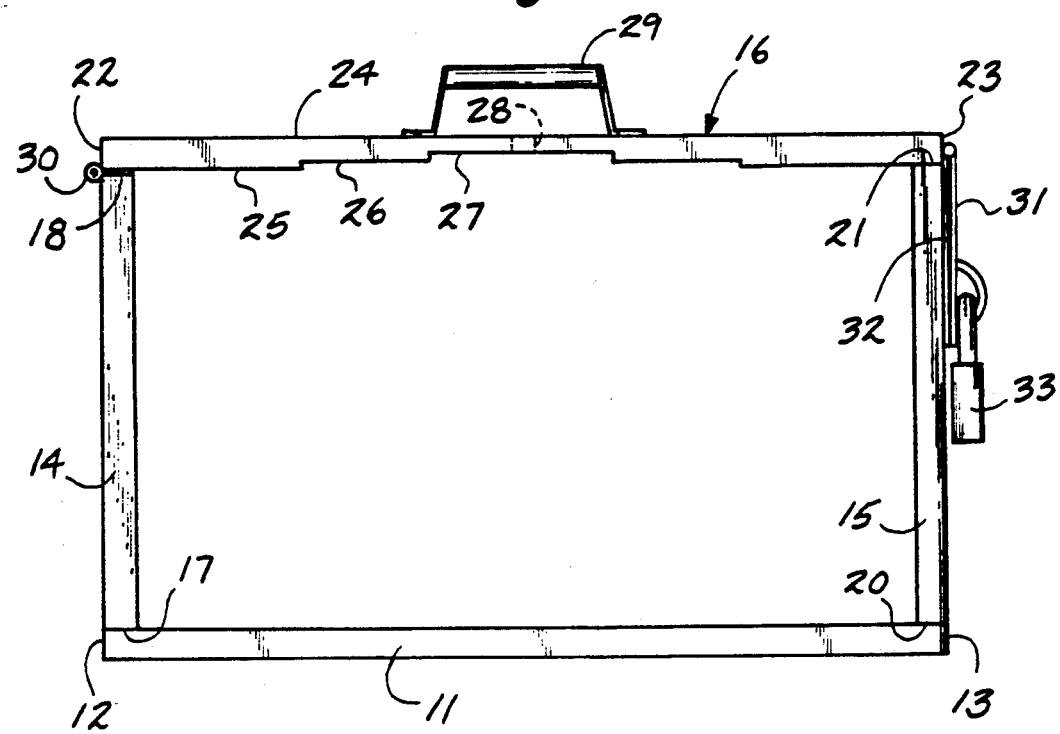
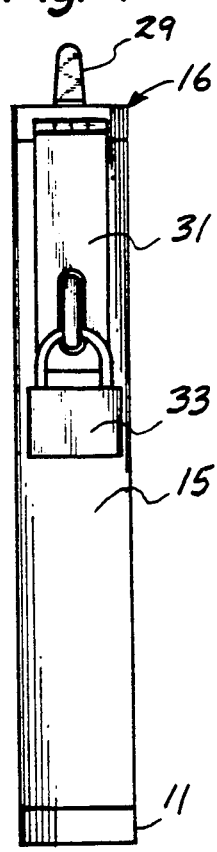

CROCK POT SECURITY BAND

BACKGROUND OF THE INVENTION

1. Field of the Invention

The field of invention relates to guard structure, and more particularly pertains to a new and improved crock pot security band arranged for the surrounding of a crock pot preventing unauthorized access thereto.

2. Description of the Prior Art

Crock pots, typically of electric types, are utilized in the prior art for slow cooking. Such crock pots require the vessel to maintain a closed configuration during use, wherein access within the crock pot adversely effects the cooking procedure. Crock pot structure is typically of a surrounding pot having a lid, including a knob member mounted thereon, such as exemplified in U.S. Pat. No. 5,031,509.

The instant invention attempts to overcome deficiencies of the prior art by providing for a band structure arranged for latching and containment of a crock pot therewithin preventing inadvertent and unauthorized access relative to contents within a crock pot and in this respect, the present invention substantially fulfills this need.

SUMMARY OF THE INVENTION

In view of the foregoing disadvantages inherent in the known types of guard apparatus now present in the prior art, the present invention provides a crock pot security band wherein the same is arranged to effect surrounding of a crock pot in a selectively locking relationship. As such, the general purpose of the present invention, which will be described subsequently in greater detail, is to provide a new and improved crock pot security band which has all the advantages of the prior art guard apparatus and none of the disadvantages.

To attain this, the present invention provides a base plate including first and second guard plates mounted to opposed ends of the base plate in an orthogonal relationship, with a lock plate hingedly mounted to one of the guard plates and arranged for selective locking to a second of the guard plates to provide for a surrounding band structure relative to a crock pot positioned therewithin. The lock plate includes a stepped bottom wall to position the crock pot lid therewithin, with the crock pot lid having a crock pot lid knob arranged for projection through an associated bottom wall opening.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved crock pot security band which has all the advantages of the prior art guard apparatus and none of the disadvantages.

It is another object of the present invention to provide a new and improved crock pot security band which may be easily and efficiently manufactured and marketed.

It is a further object of the present invention to provide a new and improved crock pot security band which is of a durable and reliable construction.

An even further object of the present invention is to provide a new and improved crock pot security band which is susceptible of a low cost of manufacture with regard to both materials and labor, and which accordingly is then susceptible of low prices of sale to the consuming public, thereby making such crock pot security bands economically available to the buying public.

Still yet another object of the present invention is to provide a new and improved crock pot security band which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic bottom view of the invention.

FIG. 2 is an isometric illustration of the invention.

FIG. 3 is an orthographic side view of the invention.

FIG. 4 is an orthographic end view of the invention.

DESCRIPTION OF THE PREFERRED EMBODIMENT

Figure 5:
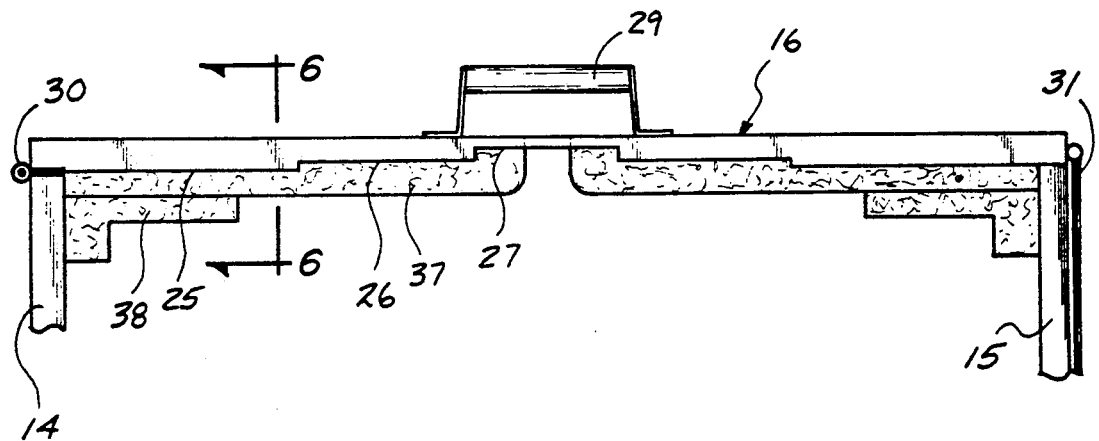
FIG. 5 is an enlarged orthographic view of the lock plate structure having cushion members mounted thereto.
Figure 6:
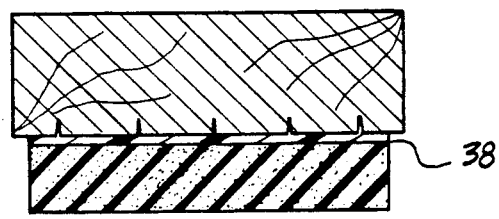
FIG. 6 is an orthographic view, taken along the lines 6—6 of FIG. 5 in the direction indicated by the arrows.

With reference now to the drawings, and in particular to FIGS. 1 to 8 thereof, a new and improved crock pot security band embodying the principles and concepts of the present invention and generally designated by the reference numeral 10 will be described.

More specifically, the crock pot security band 10 of the instant invention essentially comprises a base plate 11 of rigid construction, having a base plate first end 12 spaced from a base plate second end 13. A first guard plate 14 is provided of rigid construction, having a first guard plate first end 17 fixedly and orthogonally mounted to the base plate 11 at the base plate first end 12, with the first guard plate including a first guard plate second end 18. A second guard plate 15 of rigid construction is provided arranged in a parallel coextensive relationship relative to the first guard plate 14, with the second guard plate including a second guard plate first end 20 fixedly and orthogonally mounted to the base plate 11 and the base plate second end 13. A rigid lock plate 16 is provided, having a lock plate first end 22, including a hinge 30 hingedly mounting the lock plate first end 22 to the first guard plate second end 18. The lock plate 16 includes a lock plate second end 23 having a first latch plate 31 hingedly mounted to the lock plate second end 23 receiving a second latch plate 32 therethrough permitting securement of the lock member 33 to the second latch plate hoop directed through the first latch plate permitting securement of the lock member 33 preventing disengagement of the first latch plate 31 relative to the second latch plate 32.

The lock plate 16 includes a top wall 24 spaced from a first bottom wall 25 in a parallel relationship, with the first bottom wall 25 having a second bottom wall 26 recessed medially of the first bottom wall, and further including a third bottom wall recessed medially of the second bottom wall, and a third bottom wall opening 28 directed orthogonally from the third bottom wall 27 through the top wall 24. A U-shaped handle 29 is mounted to the top wall and extends over the third bottom wall opening 28 and mounted medially of the lock plate top wall 24.

A crock pot bowl 34 is arranged for positioning within the band structure, as defined by the base plate 11, the first and second guard plates 14 and 15 respectively, and the lock plate 16. The crock pot includes a lid 35 received within the stepped lock plate bottom wall surface, having a lid knob 36 directed through the third bottom wall opening 28 permitting positioning of the lock plate and crock pot bowl relative to one another.

First resilient cushion layer segments 37 are mounted to the latch plate bottom wall surface extending from the first and second guard plates spaced apart to receive the third bottom wall opening 29 therethrough. Attached to each of the segments is a second cushion layer 38 of an L-shaped configuration.

Figure 7:
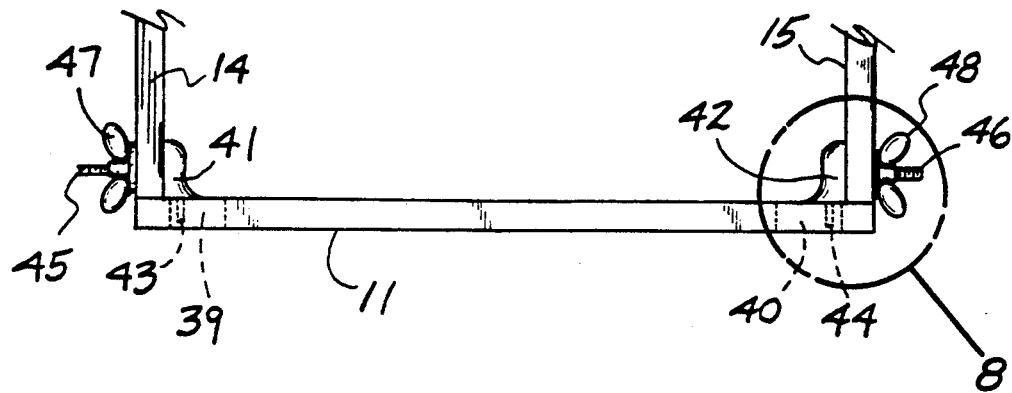
FIG. 7 is an orthographic view of the base plate having cushion clamping jaws.
Figure 8:
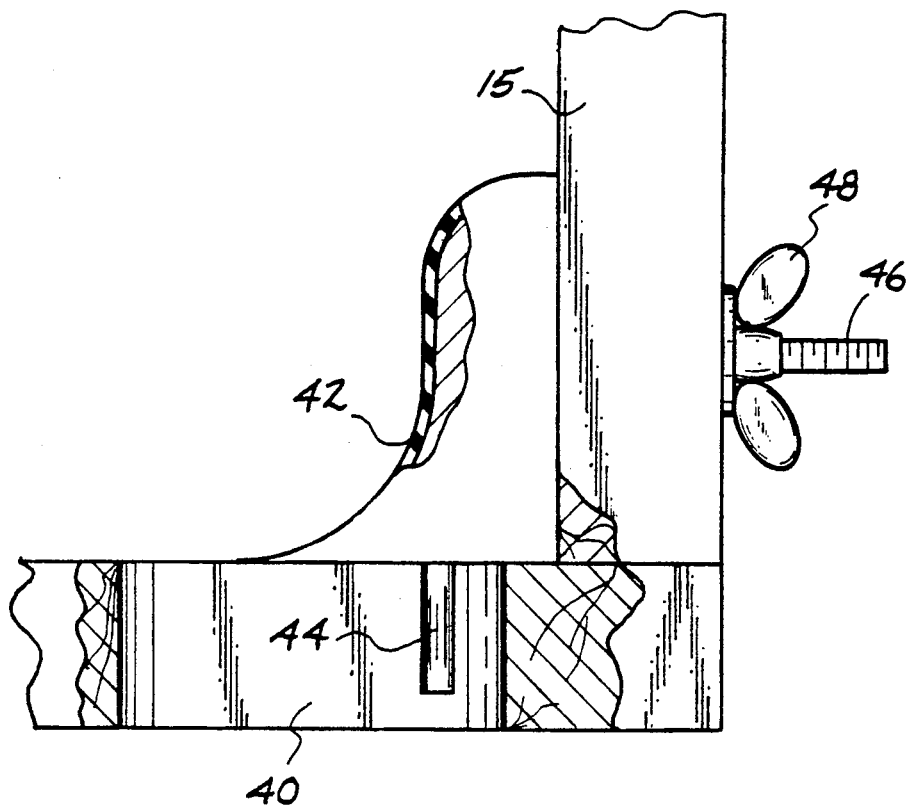
FIG. 8 is an enlarged orthographic view of section 8 as set forth in FIG. 7.

The FIGS. 7 and 8 indicate the use of respective first and second cushion jaws 41 and 42 mounted to the base plate 11 in adjacency to the first and second guard plates 14 and 15. The first and second cushion jaws 41 and 42 include respective first and second guide rods 43 and 44 that are received through respective first and second slots 39 and 40 directed through the base plate 11 permitting sliding of the cushion jaws towards one another in a facing relationship, wherein the first and second cushion jaws 41 and 42 include respective first and second externally threaded adjusting rods 45 and 46 orthogonally directed through the respective first and second guard plates 14 and 15, wherein first and second adjuster nuts 47 and 48 rotatably and securedly mounted to the first and second guard plates permit, upon rotation of the first and second adjustment rods 47 and 48, projection and retraction of the first and second cushion jaws 41 and 42 towards one another to effect securement of the crock pot bowl 34 in a secure fixed relationship within the band structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily, apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A crock pot security band for selectively securing a crock pot therewithin, wherein the security band comprises, a rigid base plate having a base plate first end spaced from a base plate second end, and a first guard plate and second guard plate, the first guard plate having a first guard plate first end and a first guard plate second end, the second guard plate having a second guard plate first end and a second guard plate second end, with the first guard plate first end fixedly and orthogonally mounted to the base plate at the base plate first end, and the second guard plate fixedly and orthogonally mounted to the base plate at the second guard plate first end, with the first guard plate and the second guard plate arranged in a parallel coextensive relationship relative to one another, and a lock plate, the lock plate having a lock plate first end and a lock plate second end, the lock plate first end including a lock plate hinge, with the lock plate hinge mounted to the first guard plate second end, the lock plate second end having a lock plate latch means for selectively securing the lock plate to the second guard plate, and the latch means includes a first latch plate hingedly mounted to the lock plate second end, and a second latch plate fixedly mounted to the second guard plate adjacent the second guard plate second end, with the second latch plate having a latch plate loop arranged for projection through the first latch plate, and a lock member directed through the latch plate loop upon projection of the latch plate loop through the first latch plate, and the lock plate includes a lock plate top wall and a lock plate stepped bottom wall, wherein the stepped bottom wall includes a first bottom wall arranged in a parallel facing relationship relative to the base plate, and a second bottom wall medially of the first bottom wall recessed relative to the first bottom wall oriented between the first bottom wall and the top wall, and a third bottom wall recessed relative to the second bottom wall medially of the second bottom wall oriented between the second bottom wall and the top wall, with the third bottom wall including an opening orthogonally directed from the third bottom wall through the top wall, and a U-shaped handle extending over the third bottom wall opening mounted to the latch plate top wall.

2. A security band as set forth in claim 1 including a plurality of first resilient cushion layer segments mounted to the stepped bottom wall in a spaced relationship, with a plurality of second cushion layers provided, wherein one of said second cushion layers is mounted to each of said first resilient cushion layer segments, and wherein each of the second cushion layers are of an L-shaped configuration.

3. A security band as set forth in claim 2 including a first slot directed through the base plate adjacent the first guard plate, and a second slot directed through the base plate adjacent the second guard plate, and a first cushion jaw mounted over the first slot, a second cushion jaw mounted over the second slot, with the first cushion jaw having a first guide rod directed into the first slot, and the second cushion jaw having a second guide rod directed into the second slot, and a first externally threaded adjuster rod mounted to the first cushion jaw extending slidably through the first guard plate, and a second externally threaded rod mounted to the second cushion jaw extending slidably through the second guard plate, with a first adjuster nut mounted to the first guard plate and rotatably securable about the first adjuster rod, and a second adjuster nut rotatably mounted about the second adjuster rod mounted to the second guard plate, whereupon rotation of the first and second adjuster nuts permit selective displacement of the first and second cushion jaws along the respective first and second slots.

* * * * *